US007010125B2

(12) United States Patent
Lotspiech et al.

(10) Patent No.: US 7,010,125 B2
(45) Date of Patent: Mar. 7, 2006

(54) METHOD FOR TRACING TRAITOR RECEIVERS IN A BROADCAST ENCRYPTION SYSTEM

(75) Inventors: Jeffrey Bruce Lotspiech, San Jose, CA (US); Dalit Naor, Palo Alto, CA (US); Simeon Naor, Palo Alto, CA (US)

(73) Assignee: Interntional Business Machines Corporation, Armonk, NY (US)

( * ) Notice: Subject to any disclaimer, the term of this patent is extended or adjusted under 35 U.S.C. 154(b) by 900 days.

(21) Appl. No.: 09/771,239

(22) Filed: Jan. 26, 2001

(65) Prior Publication Data

US 2002/0133701 A1    Sep. 19, 2002

(51) Int. Cl.
H04N 7/167       (2006.01)
H04L 9/00        (2006.01)

(52) U.S. Cl. .................. 380/242; 380/281; 380/45; 725/31

(58) Field of Classification Search ......... 380/242, 380/240, 210, 200, 201, 227, 228, 277, 278, 380/279, 281, 44, 45; 725/25, 31
See application file for complete search history.

(56) References Cited

U.S. PATENT DOCUMENTS

| 4,417,338 A | * | 11/1983 | Davida ................... 380/286 |
| 5,125,028 A | * | 6/1992 | Naito ...................... 380/223 |
| 5,241,597 A |   | 8/1993 | Bright ..................... 380/21 |
| 5,675,649 A |   | 10/1997 | Brennan et al. .......... 380/21 |
| 5,748,736 A |   | 5/1998 | Mittra .................... 713/163 |
| 5,812,670 A |   | 9/1998 | Micali .................... 380/25 |
| 6,098,056 A |   | 8/2000 | Rusnak et al. ............ 705/75 |
| 6,138,119 A |   | 10/2000 | Hall et al. ................ 707/9 |
| 6,222,923 B1 | * | 4/2001 | Schwenk ................. 380/44 |
| 6,247,127 B1 |   | 6/2001 | Vandergeest ............. 713/100 |
| 6,285,991 B1 |   | 9/2001 | Powar .................... 705/76 |
| 6,397,329 B1 |   | 5/2002 | Aiello et al. ............. 713/155 |
| 6,629,243 B1 |   | 9/2003 | Kleinman ................ 713/163 |
| 6,651,149 B1 | * | 11/2003 | Iwasaki .................. 711/163 |
| 6,684,331 B1 |   | 1/2004 | Srivastava .............. 713/163 |
| 2002/0090090 A1 |   | 7/2002 | Van Rijnsoever et al. .. 380/279 |

FOREIGN PATENT DOCUMENTS

WO    WO 99/33270    7/1999

OTHER PUBLICATIONS

Yoshida, Maki et al. "A Subscriber-Excluding and Traitor-Tracing Broadcast Distribution System", IEICE Transactions on Fundamentals of Electronics, Communications, and Computer Sciences, vol. E84-A, No. 1, Jan. 1, 2001. pp. 247-255.*

(Continued)

Primary Examiner—Emmanuel L. Moise
Assistant Examiner—Zachary A. Davis
(74) Attorney, Agent, or Firm—John L. Rogitz (57) ABSTRACT

A method for tracing traitor receivers in a broadcast encryption system. The method includes using a false key to encode plural subsets representing receivers in the system. The subsets are derived from a tree using a Subset-Cover system, and the traitor receiver is associated with one or more compromised keys that have been obtained by a potentially cloned pirate receiver. Using a clone of the pirate receiver, the identity of the traitor receiver is determined, or the pirate receiver clones are rendered useless for decrypting data using the compromised key by generating an appropriate set of subsets.

21 Claims, 10 Drawing Sheets

TRACING ALGORITHM

OTHER PUBLICATIONS

Publication: "Revocation and Tracing Schemes for Stateless Receivers". Naor et al. pp. 1-34. Jul. 2001, U.S.A.

White Paper: "A Subscriber-Excluding and Traitor-Tracing Broadcast Distribution System." Yoshida et al. IEICE Trans. Fundamentals, vol. E84-A. No. 1, Jan. 1, 2001.

Publication: "Dynamic Traitor Tracing". Fiat et al. International Cryptology Conference, 19th, Santa Barbara. Proceedings of CRYPTO '99, Advances in Cryptology, LNCS, vol. 1666, pp. 354-371. Aug., 1999.

Publication: "Privilege Transfer and Revocation in a Port-Based System". Ramamritham et al. IEEE Transactions on Software Engineering. vol. 12; Issue 5, pp. 635-648. May, 1986.

Publication: "Secure Group Communications Using Key Graphs". Wong et al. Proceedings of ACM SIGCOMM. pp. 1-12. Sep., 1998. Canada.

Publication: "Efficient Communication-Storage Tradeoffs for Multicast Encryption". Canetti et al. EUROCRYPT 1999. pp. 459-474.

Publication: "Key Establishment in Large Dynamic Groups Using One-Way Function Trees". McGrew et al. Submitted to IEEE Transactions on Software Engineering. pp. 1-13. May, 1999.

Publication: "Multicast Security: A Taxonomy and Some Efficient Constructions". Canetti et al. Proc. of INFOCOM. vol. 2, pp. 708-716. New York, Mar. 1999.

Publication: "Broadcast Encryption". CRYPTO 1992, LNCS vol. 839, pp. 257-270, New York, Mar. 1994.

Publication: "Sequential Traitor Tracing". R. Safavi-Naini and Y. Wang. CRYPTO 2000, LNCS vol. 1880, pp. 316-332, 2000.

Publication: "Efficient Trace and Revoke Schemes". M. Naor and B. Pinkas. Financial Cryptography '2000, LNCS 1962, pp. 1-20, 2001.

Publication: "Efficient Methods for Integrating Traceability and Broadcast Encryption". E. Gafni, Jessica Staddon and Yiqun Lisa Yin. CRYPTO '99, Springer-Verlag LNCS 1666, pp. 372-387, 1999.

Publication: "Trials of Traced Traitors". Birgit Pfitzmann. Workshop on Information Hiding, Cambridge, UK, LNCS, vol. 1174, Springer-Verlag, pp. 1-16, 1996.

Publication: "Digital Signets: Self-Enforcing Protection of Digital Information". C. Dwork, J. Lotspiech and M. Naor. $28^{th}$ Symposium on the Theory of Computation, pp. 489-498, 1996.

Publication: "An Efficient Public Key Traitor Tracing Scheme". D. Boneh and M. Franklin, Proceedings CRYPTO '99, LNCS, vol. 1666, Springer-Verlag, pp. 1-13, i-iv, 1999.

Publication: "Collusion-Secure Fingerprinting for Digital Data". D. Boneh and J. Shaw. IEEE Transactions on Information Theory, vol. 44, No. 5, pp. 1897-1905, 1998.

Patent Application: "Forensic Media Key Block for Identifying Compromised Keys". Lotspiech. Co-pending U.S. Appl. No. 09/564,658, filed May 3, 2000.

Publication: "Threshold Traitor Tracing". M. Naor and B. Pinkas, CRYPTO '98, LNCS vol. 1462, pp. 502-517, 1998.

Publication: "Efficient Dynamic Traitor Tracing". O. Berkman, M. Parnas and J. Sgall. Proceedings of the $11^{th}$ ACM-SIAM Symp. On Discrete Algorithms (SODA), pp. 586-595, 2000.

Publication: "Tracing Traitors". B. Chor, A. Fiat, M. Naor and B. Pinkas. IEEE Transactions on Information Theory, vol. 46, No. 3, May 2000.

Report: "Key Management for Multicast: Issues and Architectures". D. Waller, E. Harder, and R. Agee. National Security Agency, pp. 1-19, Jun. 1999.

Publication: "On the Generation of Cryptographically Strong Pseudorandom Sequences". Adi Shamir, ACM Transactions on Computer Systems, vol. 1, No. 1, pp. 38-44, Feb. 1983.

Publication: "Tracing Traitors". B. Chor, A. Fiat and M. Naor. CRYPTO '94, Incs vol. 839, pp. 257-270, 1994.

* cited by examiner

FIG. 1

FIG. 2
OVERALL FLOW - INITIALIZATION
AND ENCRYPTION

FIG. 3
OVERALL FLOW - DECRYPTION
(AT EACH RECEIVER u)

FIG. 4 - KEY ASSIGNMENT,
COMPLETE SUBTREE

FIG. 5 - COMPLETE SUBTREE
ENCRYPTION USING "COVER"

FIG. 6 - COMPLETE SUBTREE DECRYPTION

FIG. 7 - COMPLETE SUBTREE

FIG. 10
DEFINING COVER-SUBSET
DIFFERENCE

FIG. 12
DECRYPTION, SUBSET DIFFERENCE

FIG. 13
KEY ASSIGNMENT - SUBSET DIFFERENCE

FIG. 14 - ASSIGNMENT OF LABELS SUBSET DIFFERENCE METHOD

FIG. 15
TRACING ALGORITHM

FIG. 16
SUBSET TRACING

METHOD FOR TRACING TRAITOR RECEIVERS IN A BROADCAST ENCRYPTION SYSTEM

BACKGROUND OF THE INVENTION

1. Field of the Invention

The present invention relates generally to broadcast data encryption that uses encryption keys.

2. Description of the Related Art

Various broadcast encryption systems have been proposed for encrypting content that is broadcast to potentially millions of receivers using recorded media such as CDs and DVDs, or via wireless broadcast methods such as satellite broadcasts. These systems are intended to encrypt content such that only authorized receivers (also referred to as "users" and "player-recorders") can decode and play the content, but software- or hardware-implemented pirate devices (also referred to as "clones" and "evil devices") that somehow manage to obtain a valid decryption key from an authorized device ("traitor") nonetheless cannot decrypt and play the content.

An example of such a system is disclosed in the present assignee's U.S. Pat. No. 6,118,873, incorporated herein by reference. As set forth therein, only authorized player-recorders can play and/or copy the content and only in accordance with rules established by the vendor of the content. In this way, pirated copies of content, which currently cost content providers billions of dollars each year, can be prevented.

Another example of a broadcast encryption system is the "Subset Cover" system disclosed in the present assignee's co-pending U.S. patent application Ser. No. 09/770,877, incorporated herein by reference. This latter system, details of which are set forth below for illustration, is directed to the difficult scenario of "stateless" receivers, i.e., receivers that do not necessarily update their encryption state between broadcasts to accept countermeasures against pirate devices. For example, a television that subscribes to a pay channel might have its set-top box deenergized for a period of time during which updated encryption data might be broadcast over the system. Such a device would be rendered "stateless" if it happens to be unable to update itself after being reenergized, and would not receive updates that would be necessary for future content decryption. Another example of a stateless receiver would be a player-recorder of CDs and DVDs, which ordinarily does not interact with other system components and which will not receive every possible piece of encryption data updates, since no player receives every vended disk.

As recognized by the present invention, decryption keys in broadcast encryption systems can become compromised, enabling unauthorized pirate devices to decrypt content. Such pirate devices can be implemented in hardware or in software, and in the latter case can be posted on the Internet for free downloading to anyone who wants to obtain proprietary content without paying for it. In any case, the present invention is directed to countering the propagation of pirate clones by either finding the identities of system receivers ("traitors") whose keys have been obtained by the pirate, or to render pirate clones useless by finding an encryption that cannot be decrypted by the clones but that can be decrypted by authorized users.

The present invention is particularly (but not exclusively) focussed on the problem of tracing traitors in the Subset-Cover system. Unlike the system of the above-referenced '873 patent, in the Subset-Cover system no key overlap exists between devices. One result of key overlap is that in the patented '873 system, it is perfectly normal in operation that some device keys will correctly decrypt content and some will not, so that a clone cannot ascertain whether it is being tested simply by observing whether messages being sent to it cannot be decrypted with all its keys. This is not true in the Subset-Cover system, since every device has at least one unique key. Consequently, if a clone obtains keys from multiple traitors, and if one key from one traitor is properly decrypting content while another key from another traitor is not, the clone can deduce that it is under test.

Once a clone deduces it is under test, it can undertake any one of a number of countermeasures, such as switching identities between traitors, or even self-destructing. Of course, in the case of self-destruction the licensing agency can simply obtain another clone for further (modified) testing, but this takes time. With these critical observations in mind, the present invention has provided the below solutions to one or more of the observations.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

A computer is programmed to use a false key to encode plural subsets representing stateless receivers. At least one traitor receiver in the system is associated with a compromised key that has been obtained by a cloned pirate receiver. Using a clone of the pirate receiver, the computer determines the identity of the traitor receiver, or renders the pirate receiver clones useless for decrypting data using the compromised key by generating an appropriate encryption strategy.

In another aspect, a method is disclosed for identifying a traitor receiver with an associated unique, compromised decryption key in a broadcast encryption system. The method includes receiving a set of subsets derived from a tree defining leaves, with each leaf representing a respective receiver. Also, the method includes identifying a traitor subset from the set of subsets as containing at least one traitor receiver, and then, using the traitor subset, identifying the traitor receiver.

In a preferred embodiment, the method includes determining whether the traitor subset represents one or more traitor receiver, and if so, dividing the traitor subset into two child sets, and identifying a new traitor subset using the two child sets. The preferred method also determines whether the traitor subset is a member of a frontier set, and if so, a complementary subset is removed from the frontier set.

The preferred way to identify a traitor subset includes encoding the first j subsets of the set of subsets with a false key, and then executing a binary search on the set of subsets using probabilities. The binary search ends by determining that the difference between a probability $p_j$ of decrypting a message when the first j subsets contain the false key and the probability $p_{j-1}$ of decrypting when the first j-1 subsets contain a false key is at least equal to a predetermined probability. Specifically, the traitor subset is identified when $|p_{j-1}-p_j|>p/m$, wherein m is the number of subsets in the set of subsets. The set of subsets is generated by a subset-cover scheme having the property that it generates subsets that can be bifurcated.

In another aspect, a computer program device includes logic means for accessing a tree to generate a set of subsets of the tree, the tree including leaves representing at least one traitor device characterized by a compromised key. Logic means are provided for encrypting a false key j times and for encrypting a session key m-j times, wherein m is a number of subsets in the set of subsets. Also, logic means are responsive to the means for encrypting for identifying a traitor subset. Then, logic means use the traitor subset to identify the traitor device.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

The present invention can be used with any one of a number of broadcast encryption methods. By way of non-limiting illustration, one such system—the Subset-Cover system—is first set forth, and then the present tracing algorithm is disclosed in terms of the Subset-Cover system.

Figure 1:
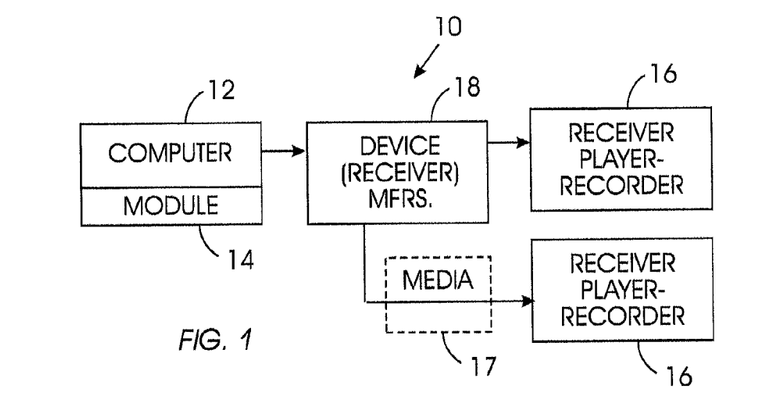
FIG. 1 is a block diagram of the present system.

Referring initially to FIG. 1, a system is shown, generally designated 10, for generating sets of keys in a broadcast content guard system, such as but not limited to the system disclosed in the above-referenced patent. By "broadcast" is meant the wide dissemination of a program from a content provider to many users simultaneously over cable (from a satellite source), or wire, or radiofrequency (including from a satellite source), or from widely marketed content disks.

As shown, the system 10 includes a key set definition computer 12 that accesses a key set definition module 14 that functions in accordance with disclosure below. The key sets defined by the computer 12 are used by potentially stateless player-recorder devices 16, also referred to herein as "receivers" and "users", that have processors inside them to decrypt content. The content along with certain keys disclosed below are provided to the respective devices via, e.g., device manufacturers 16 on media 17. A player-recorder device can access its key set to decrypt the content on media or broadcast to it via wireless communication. As used herein "media" can include but is not limited to DVDs, CDs, hard disk drives, and flash memory devices. In an alternative embodiment, each receiver 16 could execute the module 14 to undertake the step of calculating the below-disclosed "cover" by being given the set of revoked receivers and undertaking the logic set forth below.

It is to be understood that the processor associated with the module 14 accesses the modules to undertake the logic shown and discussed below, which may be executed by a processor as a series of computer-executable instructions. Two methods—the complete subtree method, and the subset difference method—are disclosed herein for using the system 10 to selectively revoke the ability of compromised receivers 16 to decrypt broadcast content without revoking the ability of any non-compromised receiver 16 to decrypt broadcast content.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

Figure 2:
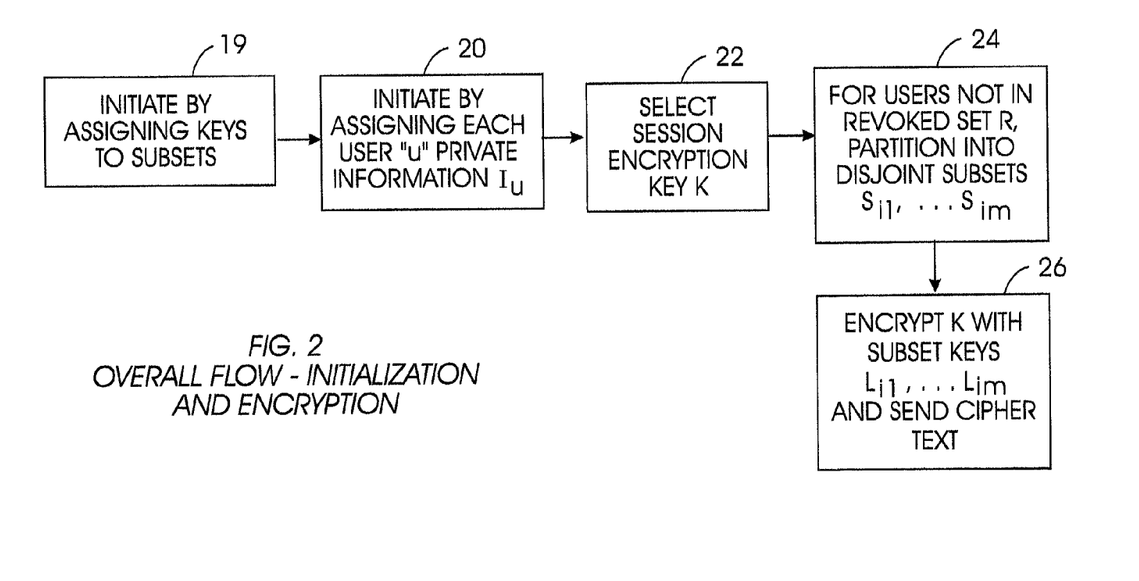
FIG. 2 is a flow chart of the overall encryption logic.

The overall logic of the present invention as embodied by both the subset difference method and complete subtree method can be seen in reference to FIG. 2. For purposes of the present disclosure, assume that N receivers 16 exist in the system 10, and that it is desirable to be able to revoke the ability of r receivers in a revoked receiver subset R to decrypt content even if the revoked receivers act in a coalition (by sharing encryption knowledge), such that any receiver can still decrypt content. Commencing at block 19, the system is initiated by assigning long-lived subset keys $L_1, \ldots, L_w$ to corresponding subsets in a universe of subsets $S_1, \ldots, S_w$ into which receivers are grouped in accordance with the disclosure below, with each subset $S_j$ thus having a long-lived subset key $L_j$ associated with it. In the first ("complete subtree") method, the subsets covering receivers not in a revoked set are simply the subtrees that are generated per the disclosure below. In the second ("subset difference") method, the subsets covering receivers not in a revoked set are defined by the difference between a first subtree and a smaller subtree that is entirely within the first subtree as set forth further below.

At block 20, the system is further initiated by supplying each receiver u with private information $I_u$ that is useful for decrypting content. Details of the private information $I_u$ are set forth further below. If $I_u$ is the secret information provided to receiver u, then each receiver u in $S_j$ can deduce $L_j$ from its $I_u$. As set forth more fully below, given the revoked set R, the non-revoked receivers are partitioned into m disjoint subsets $S_{i1}, \ldots, S_{im}$ and a short-lived session key K is encrypted m times with the long-lived subset keys $L_{i1}, \ldots, L_{im}$ associated with respective subsets $S_{i1}, \ldots, S_{im}$. The subset keys are explicit subset keys in the complete subtree method and are induced by subset labels in the subset difference method.

Specifically, at block 22 at least one session key K is selected with which to encrypt content that is broadcast in a message M, either via wireless or wired communication paths or via storage media such as CDs and DVDs. The session key K is a random string of bits that is selected anew for each message. If desired, plural session keys can be used to encrypt respective portions of the message M.

In both of the below-described methods, non-revoked receivers are partitioned into disjoint subsets $S_{i1}, \ldots, S_{im}$ at block 24 using a tree. The subsets are sometimes referred to herein as "subtrees", with the first method explicitly considering subtrees and the second method regarding subtrees as being of the form "a first subtree minus a second subtree entirely contained in the first". Each subset $S_{i1}, \ldots, S_{im}$ is associated with a respective subset key $L_{i1}, \ldots, L_{im}$. While any data tree-like structure is contemplated herein, for disclosure purposes it is assumed that the tree is a full binary tree.

Proceeding to block 26, in general the session key K is encrypted m times, once with each subset key $L_{i1}, \ldots, L_{im}$. The resulting ciphertext that is broadcast can be represented as follows, with portions between the brackets representing the header of the message M and with $i_1, i_2, \ldots, i_m$ representing indices of the disjoint subsets:

$$<[i_1, i_2, \ldots, i_m, E_{Li1}(K), E_{L12}(K), \ldots, E_{Lim}(K)], F_K(M)>$$

In one embodiment, the encryption primitive $F_K$ is implemented by XORing the message M with a stream cipher generated by the session key K. The encryption primitive $E_L$ is a method for delivering the session key K to the receivers 16, using the long-lived subset keys. It is to be understood that all encryption algorithms for $F_K$, $E_L$ are within the scope of the present invention. One preferred implementation of $E_L$ can be a Prefix-Truncation specification of a block cipher. Assume represents a random string whose length equals the block length of $E_L$, and assume that K is a short key for the cipher $F_K$ whose length is, e.g., 56 bits. Then, [$Prefix_{|K|}E_L(\otimes)$) $\oplus K$] provides a strong encryption. Accordingly, the Prefix-Truncated header becomes:

$$<[i_1, i_2, \ldots, i_m, U, [Prefix_{|K|E_{Li1}}(U)]\oplus K, \ldots, [Prefix_{|K|E_{Lim}}(U)]\oplus K], F_K(M)>$$

This advantageously reduces the length of the header to about m |K| bits instead of m |L|. In the case where the key length of $E_L$ is minimal, the following can be used to remove the factor m advantage that an adversary has in a brute-force attack which results from encrypting the same string with m different keys. The string $\oplus_j$ encrypted. That is, $$<[_1, i_2, \ldots, i_m, U, [Prefix_{|L|}E_{Li1}(U\oplus i_1)]\oplus K, \ldots, [Prefix_{51\,L|}E_{Lim}(U\oplus i_m)]\oplus K], F_K(M)>$$

Figure 3:
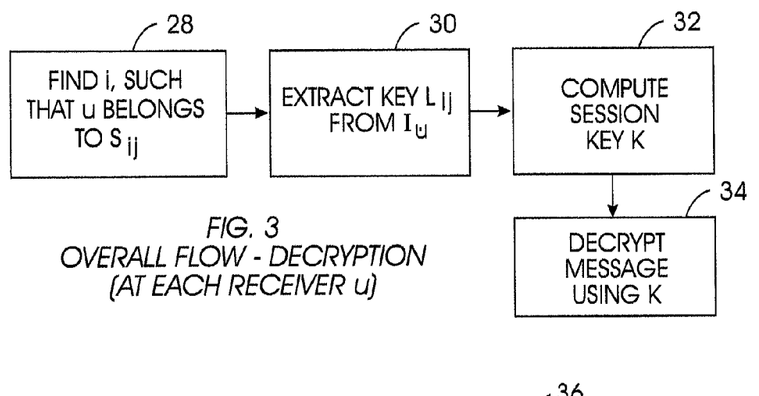
FIG. 3 is a flow chart of the overall decryption logic.
Figure 4:
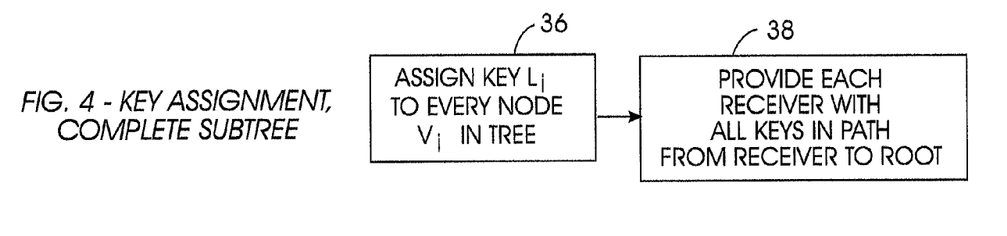
FIG. 4 is a flow chart of the key assignment portion of the complete subtree method.

Having described preferred, non-limiting ways to implement the encryption primitives E and F, attention is now directed to FIG. 3, which shows the decryption logic undertaken by the receivers 16. Commencing at block 28, each non-revoked receiver u finds a subset identifier $i_j$ in the ciphertext such that it belongs to the subset $S_{ij}$. As disclosed further below, if the receiver is in the revoked set R, the result of block 28 will be null. Next, at block 30 the receiver extracts the subset key $L_{ij}$ corresponding to the subset $S_{ij}$ using its private information $I_u$. Using the subset key, the session key K is determined at block 32, and then the message decrypted at block 34 using the session key K.

Two preferred methods for undertaking the above-described overall logic are disclosed below. In each, the collection of subsets is specified, as is the way keys are assigned to the subsets and a method to cover non-revoked receivers using disjoint subsets from the collection. In each, the set of receivers in the system establishes the leaves of a tree, such as but not limited to a full binary tree.

The first method to be discussed is the complete subtree method shown in FIGS. 4–7. Commencing at block 36 in FIG. 4, an independent and random subset key $L_i$ is assigned to each node $v_i$ in the tree. This subset key $L_i$ corresponds to a subset containing all leaves rooted at node $v_i$. Then, at block 38 each receiver u is provided with all subset keys in the direct path from the receiver to the root. As illustrated in brief reference to FIG. 7, the receivers u in the subset $S_i$ are provided with the subset key $L_i$ associated with the node $v_i$, as well as with the keys associated with the node P, which lies between the receivers in $S_i$ and the root of the tree.

Figure 5:
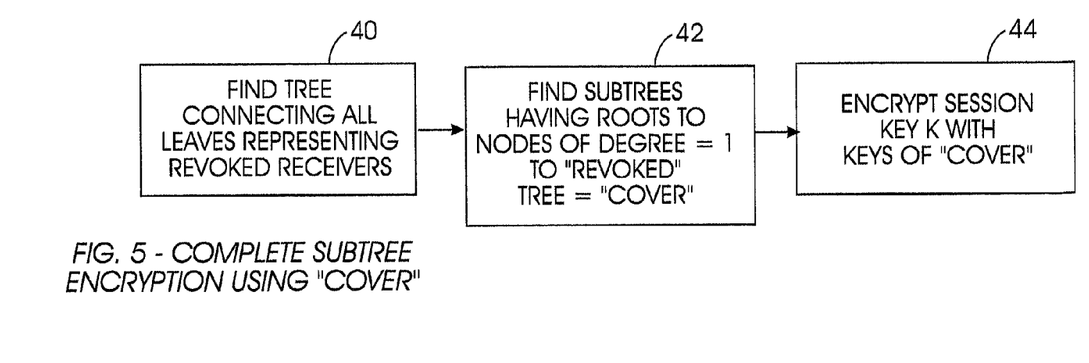
FIG. 5 is a flow chart of the encryption portion of the complete subtree method.

When it is desired to send a message and revoke the ability of some receivers from decrypting the message, the logic of FIG. 5 is invoked to partition non-revoked receivers into disjoint subsets. Commencing at block 40, a spanning tree is discovered that is defined by the leaves in R, the set of revoked receivers. The spanning tree is the minimal subtree of the full binary tree that connects the "revoked" leaves, and it can be a Steiner tree. Proceeding to block 42, the subtrees that have roots adjacent to nodes of degree one in the tree (i.e., nodes that are directly adjacent to the minimal tree) are identified. These subtrees define a "cover" and establish the subsets $S_{i1}, \ldots, S_{im}$. The cover encompasses all non-revoked receivers. Accordingly, at block 44 the session key K is encrypted using the subsets keys defined by the cover.

Figure 6:
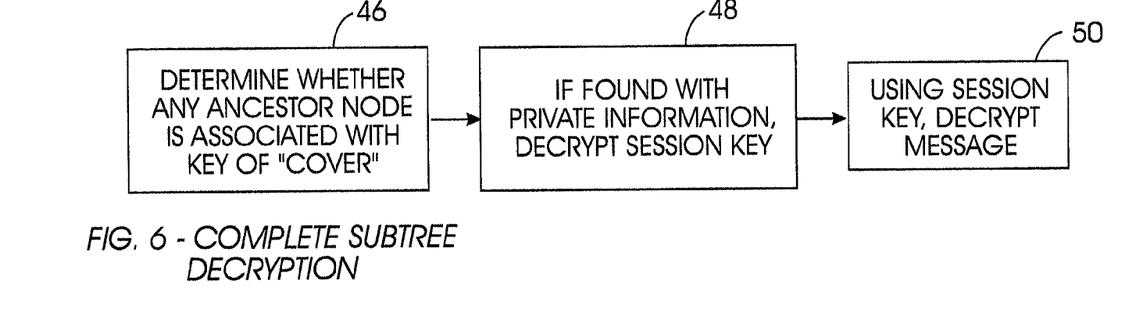
FIG. 6 is a flow chart of the decryption portion of the complete subtree method.
Figure 7:
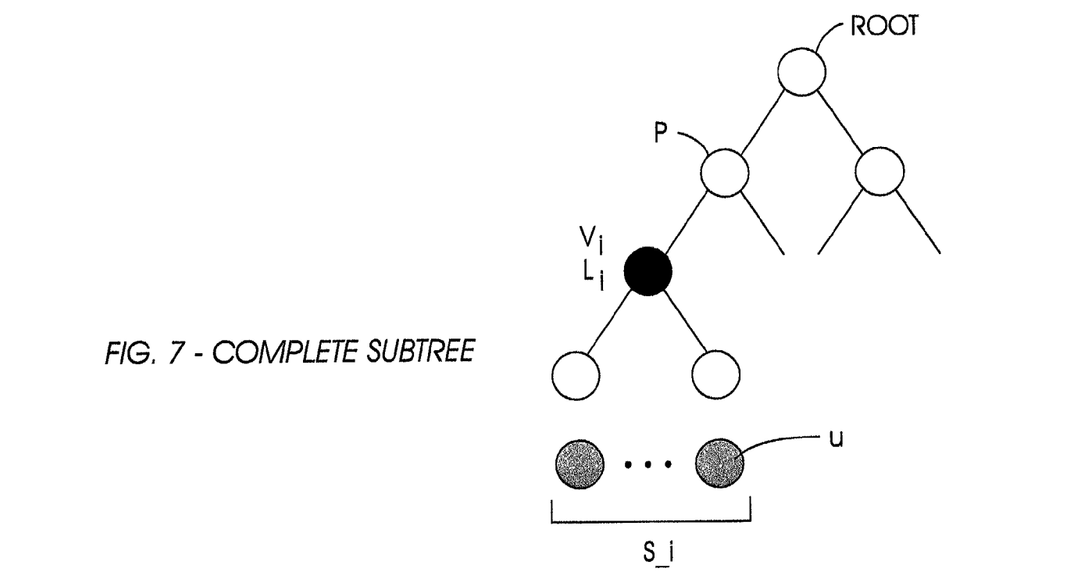
FIG. 7 is a schematic diagram of a subset of a complete subtree.

To decrypt the message, each receiver invokes the logic of FIG. 6. Commencing at block 46, it is determined whether any ancestor node of the receiver is associated with a subset key of the cover by determining whether any ancestor node is among the set $i_1, i_2, \ldots, i_m$ in the message header. The receiver's private information $I_u$, which in the complete subtree method consists of its position in the tree and subset keys associated with ancestor nodes, is used to determine this. If an ancestor is found in the message header (indicating that the receiver is a non-revoked receiver), the session key K is decrypted at block 48 using the subset key, and then the message is decrypted using the session key K at block 50.

In the complete subtree method, the header includes at most $r*\log(N/r)$ subset keys and encryptions. This is also the average number of keys and encryptions. Moreover, each receiver must store log N keys, and each receiver processes the message using at most log log N operations plus a single decryption operation.

Now referring to FIGS. 8–13, the subset difference method for revoking receivers can be seen. In the subset difference method, each receiver must store relatively more keys ($0.5 \log^2 N + 0.5 \log N + 1$ keys) than in the complete subtree method, but the message header includes only at most $2r-1$ subset keys and encryptions (1.25r on average), and this is substantially shorter than in the complete subtree method. Also, in the subset difference method the message is processed using at most log N applications of a pseudorandom number generator plus a single decryption operation.

Figure 8:
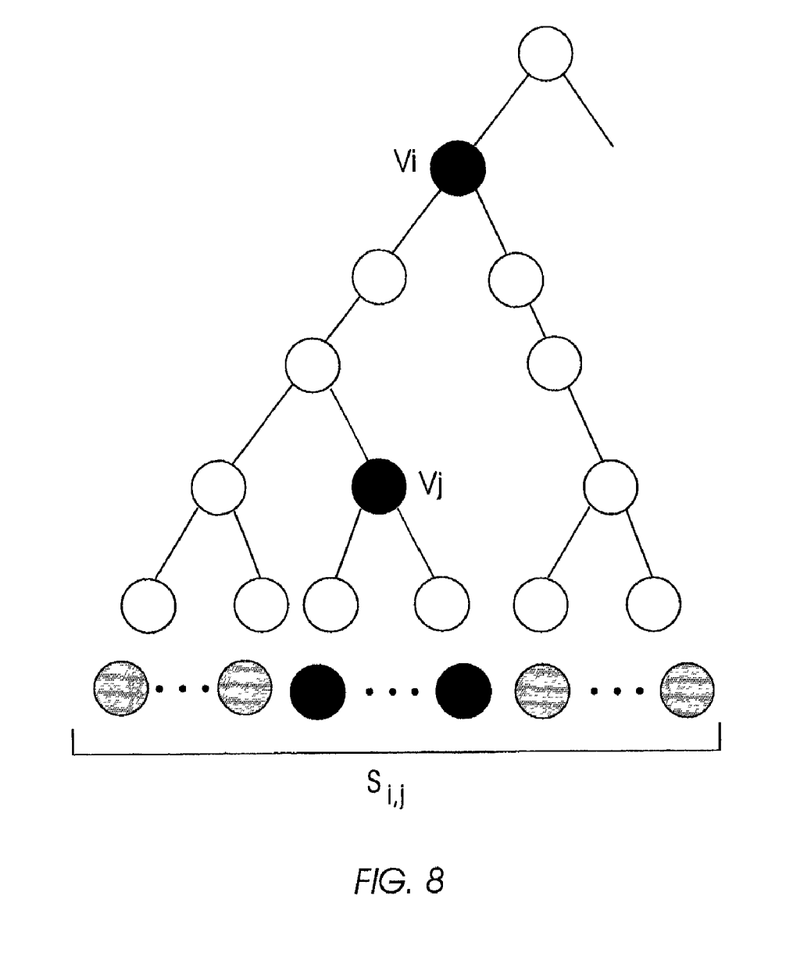
FIG. 8 is a schematic diagram of a subset in the subset difference method.
Figure 9:
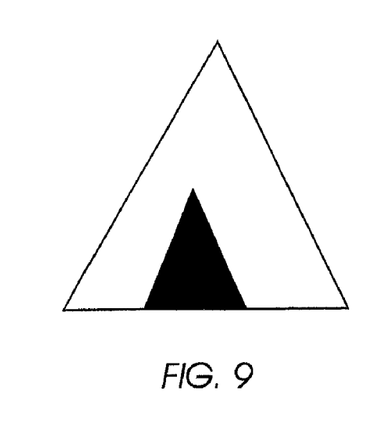
FIG. 9 is another form of a schematic diagram of the subset in the subset difference method.

Referring FIGS. 8 and 9, the subset difference method regards subsets as being the difference between a larger subset A and a smaller subset B that is entirely contained in A. Accordingly, as shown a larger subtree is rooted at node $v_i$ and a smaller subtree is rooted at node $v_j$ that descends from $v_i$. The resulting subset $S_{i,j}$ consists of all the leaves "yes" under $v_i$ except for those leaves labelled "no" (and colored more darkly than the leaves labelled "yes") under $v_j$. FIG. 9 illustrates this, with the subset $v_{i,j}$ being represented by the area within the larger triangle and outside the smaller triangle.

Figure 10:
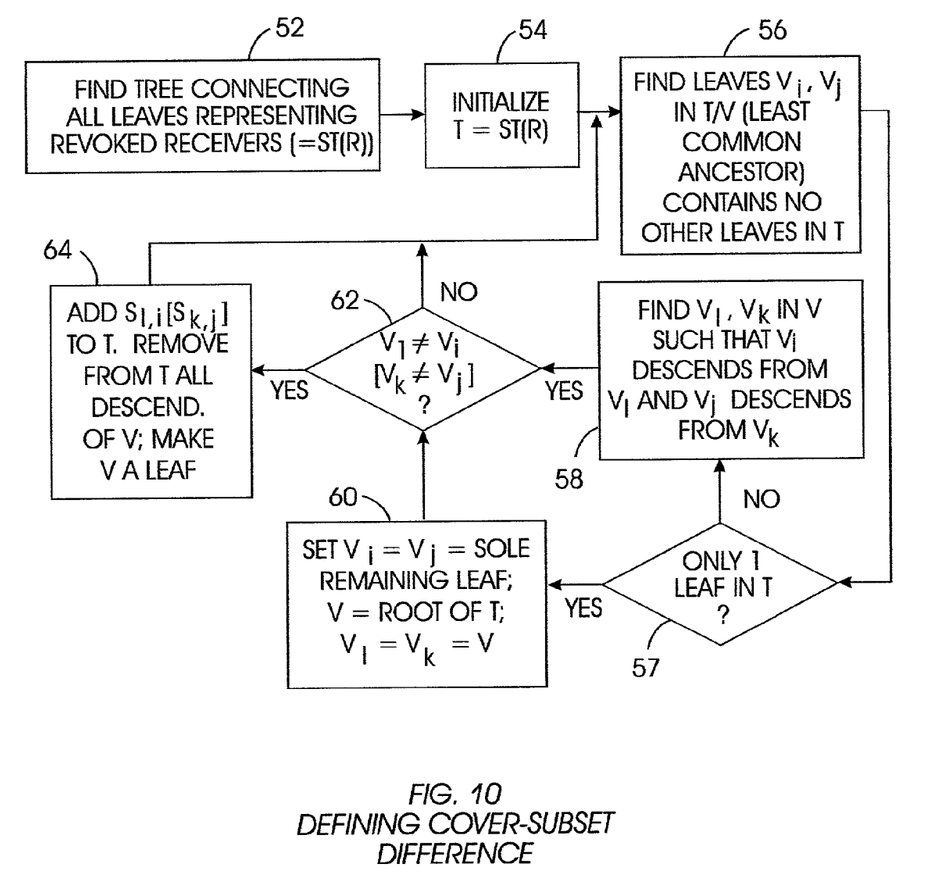
FIG. 10 is a flow chart of the logic for defining a cover in the subset difference method.

When it is desired to send a message and revoke the ability of some receivers from decrypting the message in the subset difference method, the above-described structure is used as shown in FIG. 10. Commencing at block 52, a spanning tree is discovered that is defined by the leaves in R, the set of revoked receivers. The spanning tree is the minimal subtree of the full binary tree that connects the "revoked" leaves, and it can be a Steiner tree. Proceeding to block 54, a cover tree T is initialized as the spanning tree. An iterative loop then begins wherein nodes are removed from the cover tree and subtrees are added to the cover until the cover tree T has at most one node. The output defines the cover for the non-revoked receivers.

More specifically, moving from block 54 to block 56, leaves $v_i$ and $v_j$ are found in the cover tree T such that their least common ancestor v contains no other leaves in T. At decision diamond 57 it is determined whether only one leaf exists in the cover tree T. If more than a single leaf exists, the logic moves to block 58 to find nodes $v_1$, $v_k$ in v such that $v_i$ descends from $v_1$ and $v_j$ descends from $v_k$ and such that $v_1$, $v_k$ are children of v (i.e., are direct descendants of v without any intervening nodes between v and $v_1$, $v_k$). In contrast, when only a single leaf exists in T, the logic moves from decision diamond 57 to block 60 to set $v_i=v_j$=sole remaining leaf, place v at the root of T, and set $v_1=v_k$=root.

From block 58 or 60 the logic moves to decision diamond 62. At decision diamond 62, it is determined whether $v_1$ equals $v_i$. It is likewise determined whether $v_k$ equals $v_j$. If $v_1$ does not equal $v_i$ the logic moves to block 64 to add the subset $S_{1,i}$ to T, remove from T all descendants of v, and make v a leaf. Likewise, if $v_k$ does not equal $v_j$ the logic moves to block 64 to add the subset $S_{k,j}$ to T, remove from T all descendants of v, and make v a leaf. From block 64 or from decision diamond 62 when no inequality is determined, the logic loops back to block 56.

Figure 11:
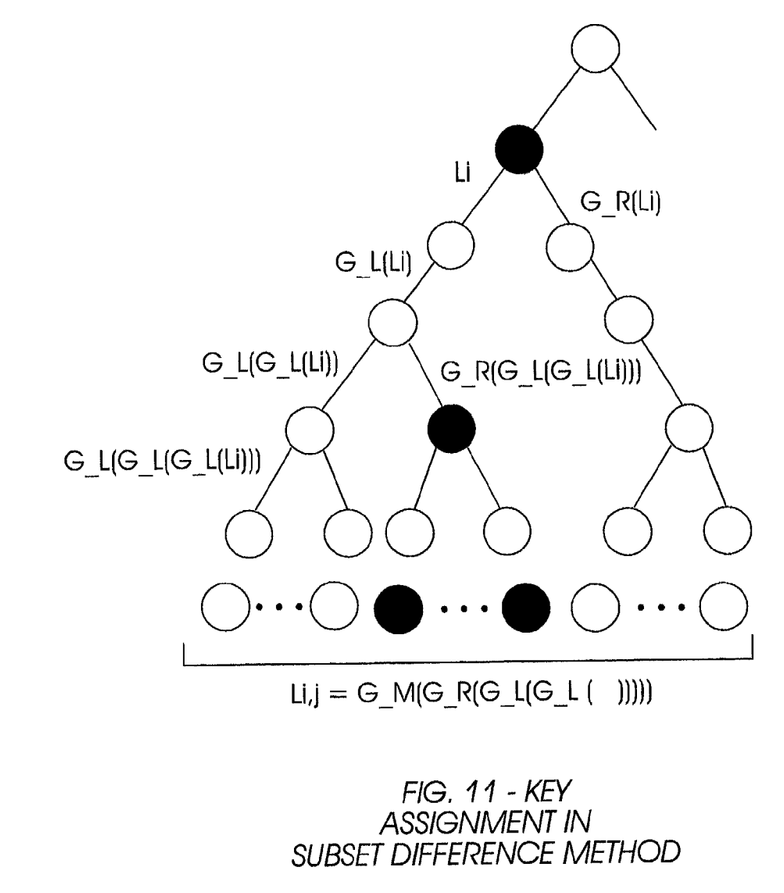
FIG. 11 is a schematic diagram of a subset of a tree in the subset difference method. illustrating key assignment.

With the above overall view of the subset difference key assignment method in mind, a particularly preferred implementation is now set forth. While the total number of subsets to which a receiver belongs is as large as N, these subsets can be grouped into log N clusters defined by the first subset i (from which another subset is subtracted). For each 1<i<N corresponding to an internal node in the full tree, an independent and random label $LABEL_i$ is selected, which induces the labels for all legitimate subsets of the form $S_{i,j}$. From the labels, the subset keys are derived. FIG. 11 illustrates the preferred labelling method discussed below. The node labelled $L_i$ is the root of the subtree $T_i$, and its descendants are labelled according to present principles.

If G is a cryptographic pseudorandom sequence generator that triples the input length, G_L(S) denotes the third left of the output of G on the seed S, G_R(S) denotes the right third, and G_M(S) denotes the middle third. Consider the subtree $T_i$ of the cover tree T rooted at the node $v_i$ with label $LABEL_i$. If this node is labelled S, its two children are labelled G_L(S) and G_R(S) respectively. The subset key $L_{i,j}$ assigned to the set $S_{i,j}$ is the G_M of the label of $LABEL_{i,j}$ of node $v_j$ derived in the subtree $T_i$. Note that each label S induces three parts, namely, the labels for the left and right children, and the key of the node. Consequently, given the label of a node it is possible to compute the labels and keys of all its descendants. In one preferred embodiment, the function G is a cryptographic hash such as the Secure Hashing Algorithm-1, although other functions can be used.

Figure 12:
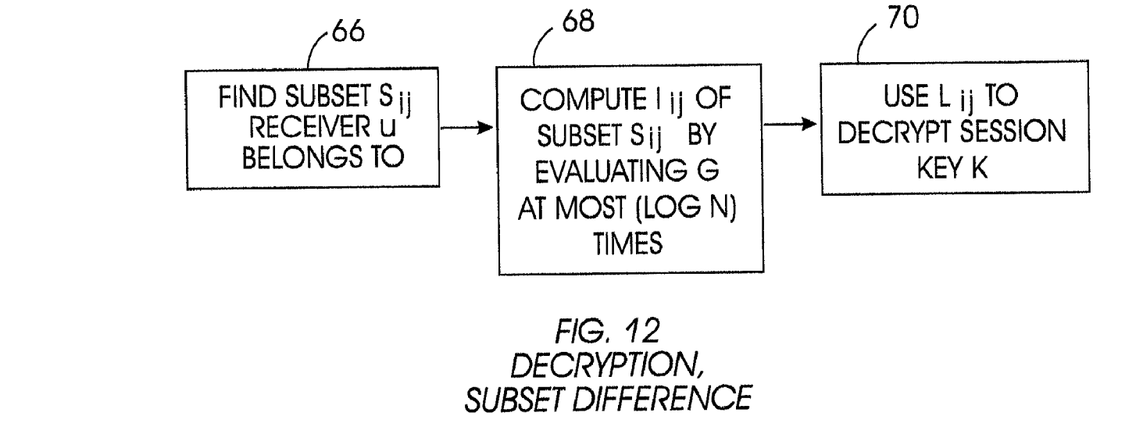
FIG. 12 is a flow chart of the decryption portion of the subset difference method.

FIG. 12 shows how receivers decrypt messages in the subset difference method. Commencing at block 66, the receiver finds the subset $S_{i,j}$ to which it belongs, along with the associated label (which is part of the private information of the receiver that allows it to derive the $LABEL_{i,j}$ and the subset key $L_{i,j}$). Using the label, the receiver computes the subset key $L_{i,j}$ by evaluating the function G at most N times at block 68. Then, the receiver uses the subset key to decrypt the session key K at block 70 for subsequent message decryption.

Figure 13:
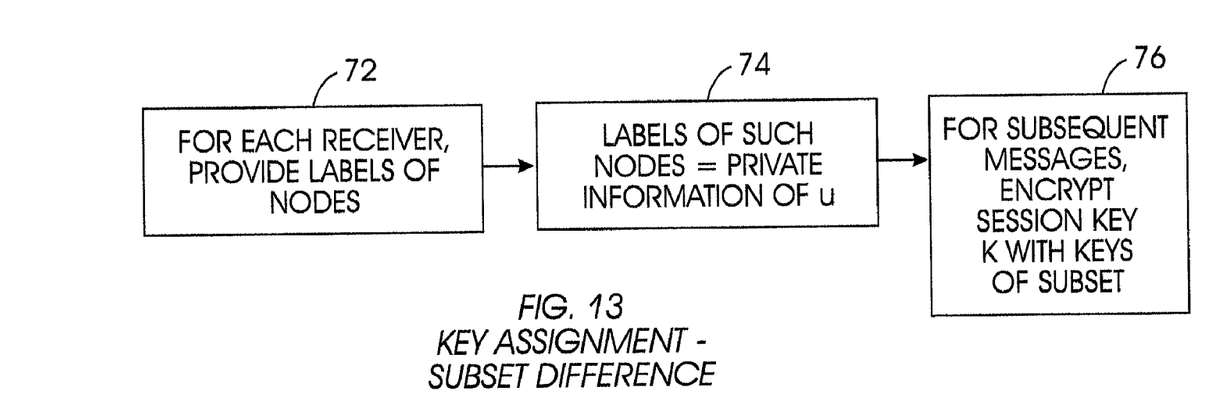
FIG. 13 is a flow chart of the logic for assigning keys in the subset difference method.

FIG. 13 shows how labels and, hence, subset keys, are assigned to receivers in the subset difference method. The labelling method disclosed herein is used to minimize the number of keys that each receiver must store.

Commencing at block 72, each receiver is provided with labels of nodes that are not in the direct path between the receiver and the root but that "hang" off the direct path and that are induced by some node $v_i$, an ancestor of u. These labels establish the private information $I_u$ of the receiver at block 74, with subsequent message session keys being encrypted with subset keys derived from the labels at block 76.

Figure 14:
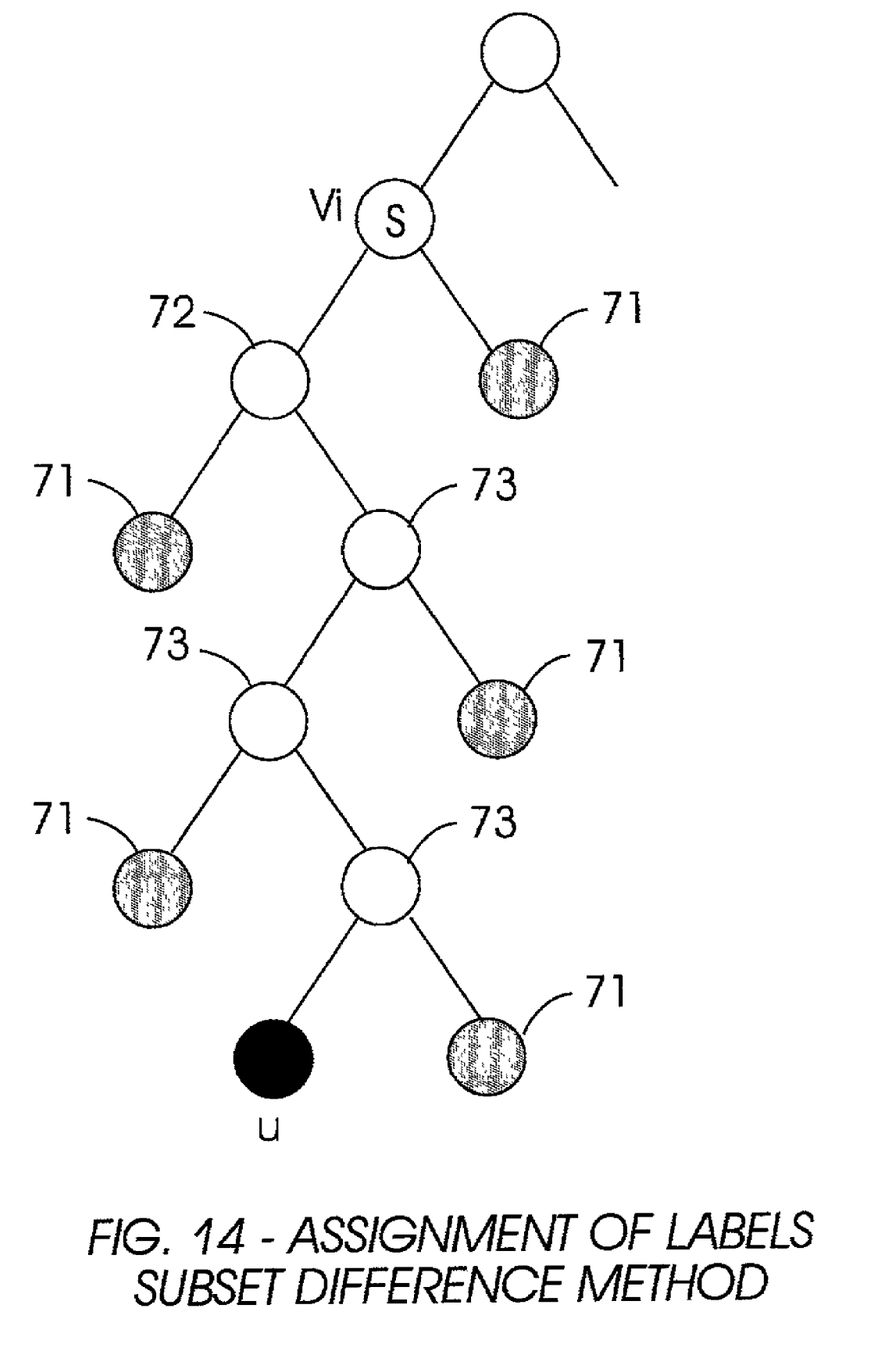
FIG. 14 is a schematic diagram of a subset of a tree in the subset difference method.

Referring briefly to FIG. 14, the above principle is illustrated. For every $v_i$ ancestor with label S of a receiver u, the receiver u receives labels at all nodes 71 that are hanging off the direct path from the node $v_i$ to the receiver u. As discussed further below, these labels are preferably all derived from S. In marked contrast to the complete subtree method, in the subset difference method illustrated in FIGS. 8–14 the receiver u does not receive labels from any node 73 that is in the direct path from the receiver u to the node $v_i$. Using the labels, the receiver u can compute the subset keys of all sets (except the direct path set) that are rooted at the node $v_i$ by evaluating the above-described function G, but can compute no other subset keys.

Conventional multicast systems lack backward secrecy, i.e., a constantly listening receiver that has been revoked nonetheless can record all encrypted content, and then sometime in the future gain a valid new key (by, e.g., re-registering) which allows decryption of past content. The present invention can be used in such scenarios to cure the lack of backwards secrecy by including, in the set of revoked receivers, all receiver identities that have not yet been assigned. This can be done if all receivers are assigned to leaves in consecutive order. In this case, revocation of all unassigned identities results in a moderate increase in message header size, but not proportionally to the number of such identities.

The present invention also recognizes that it is desirable to have concise encodings of the subsets $i_j$ in the message header and to provide a quick way for a receiver to determine whether it belongs to a subset $i_j$. Assume that a node is denoted by its path to the root, with 0 indicating a left branch and 1 indicating a right branch. The end of the path is denoted by a 1 followed by zero or more 0 bits. Thus, the root is 1000 . . . 000b, the rightmost child of the root is 01000 . . . 000b, the leftmost child is 11000 . . . 000b, and a leaf is xxxx . . . xxxx1b.

As recognized herein, the path of a larger subtree's root is a subset of the path of a smaller subtree's root, so that the subset difference can be denoted by the root of the smaller subtree plus the length of the path to the larger subtree's root. With this in mind, a receiver can quickly determine if it is in a given subset by executing the following Intel Pentium® processor loop.

Outside the loop, the following registers are set up: ECX contains the receiver's leaf node, ESI points to the message buffer (the first byte is the length of the path to the larger subtree root and the next four bytes are the root of the smaller tree), and a static table outputs 32 bits when indexed by the length of the path, with the first length bits being 1 and the remaining bits being 0.

```
loop:   MOV BYTE EBX, [ESI++]
        MOV DWORD EAX, [ESI++]
        XOR EAX, ECX
            AND EAX, TABLE[EBX]
        JNZ loop
```

If a receiver falls out of the loop, it does not necessarily mean that it belongs to the particular subset. It might be in the smaller excluded subtree, and if so, it must return to the loop. However, since in the vast majority of cases the receiver is not even in the larger subtree, almost no processing time is spent in the loop.

In a further optimization of the subset difference method, the system server does not have to remember each and every label, which could run into the millions. Instead, the label of the $i^{th}$ node can be a secret function of the node. The secret function could be a triple DES encryption that uses a secret key to render the label of the $i^{th}$ node when applied to the number i.

Figure 15:
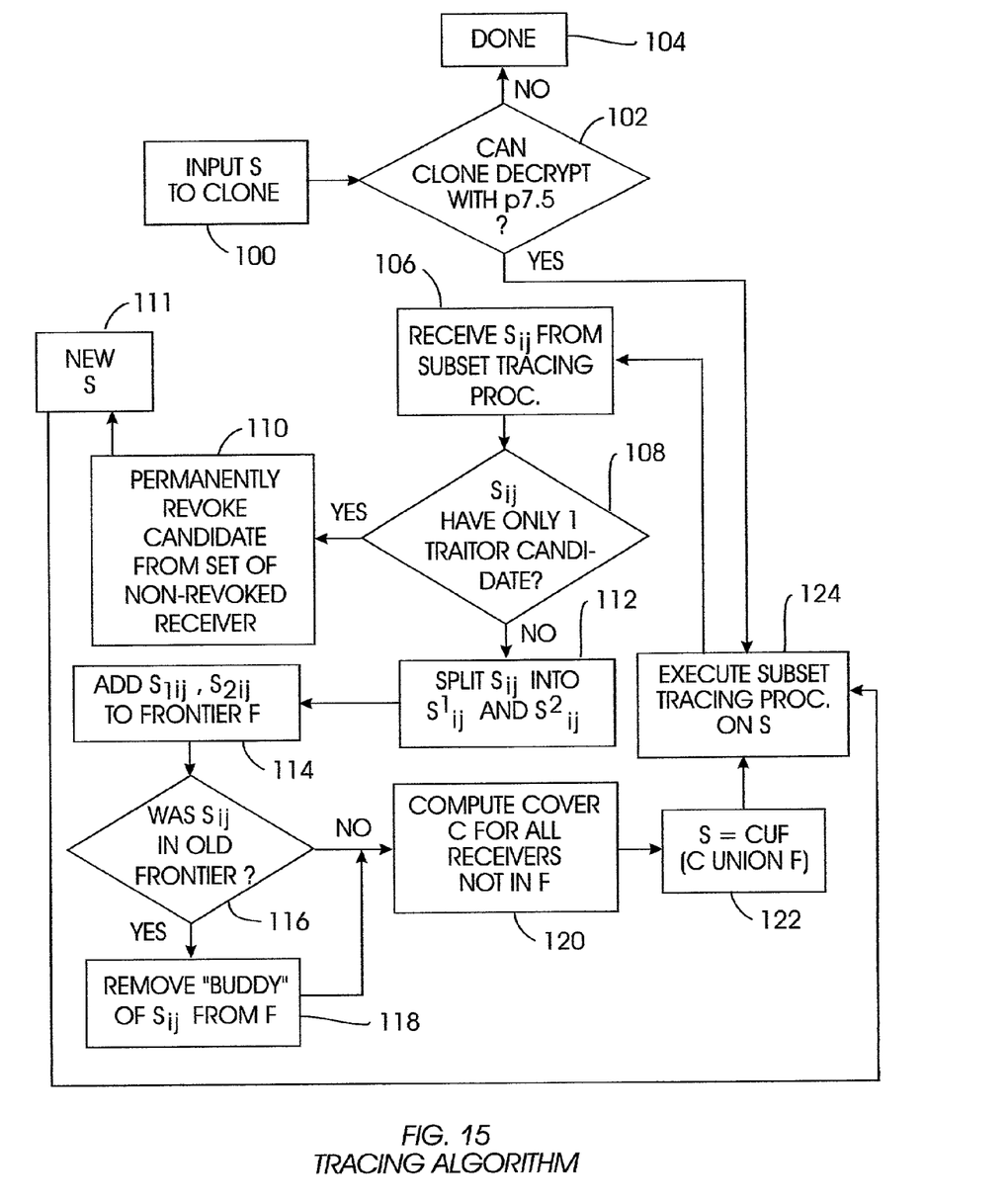
FIG. 15 is a flow chart showing the present tracing logic.
Figure 16:
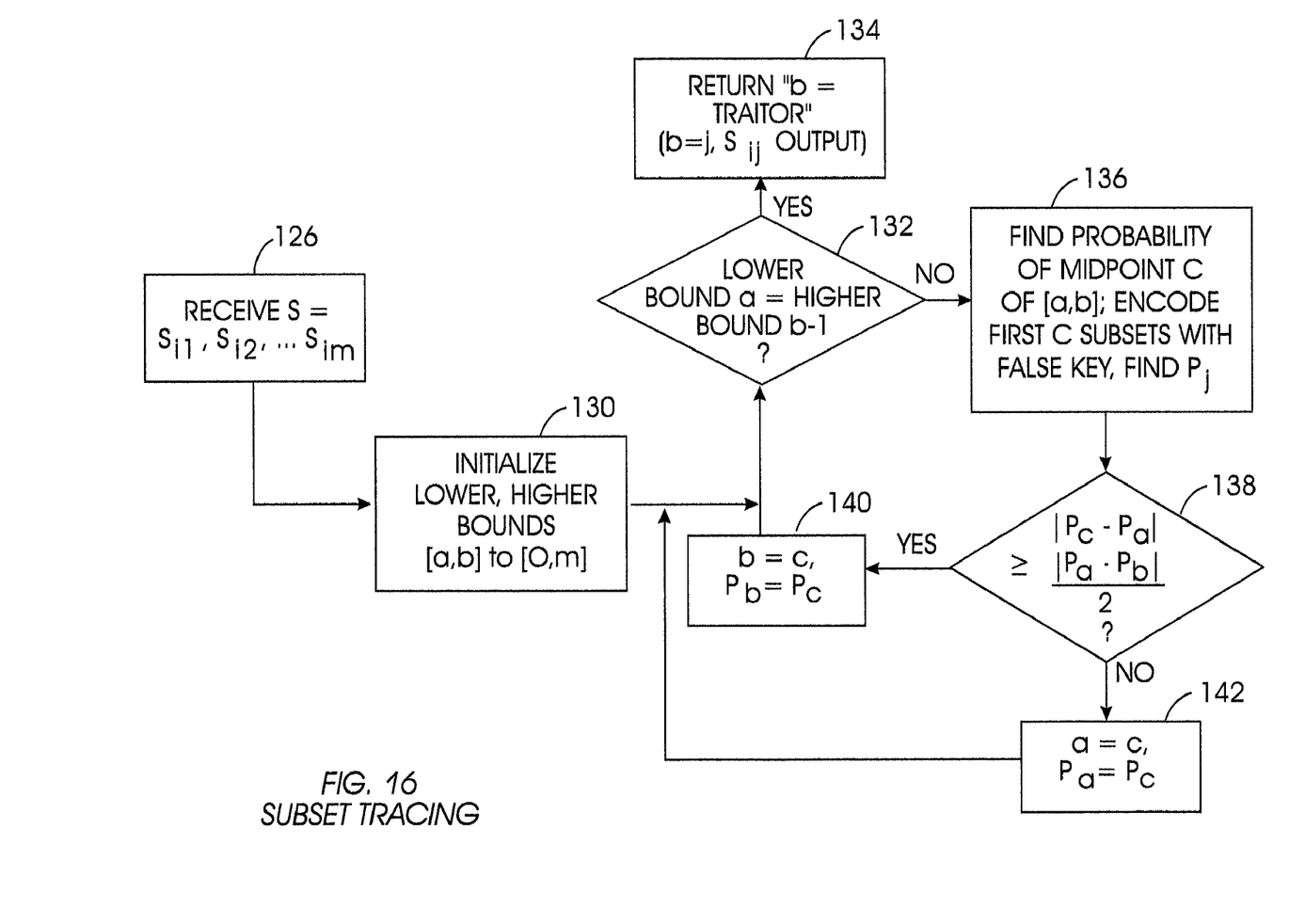
FIG. 16 is a flow chart showing the subset tracing modules of the tracing logic.

Having set forth the details of the Subset-Cover system with which the present invention can be used, attention is now directed to FIGS. 15 and 16. Commencing at block 100, a partition S of subsets $S_{i1}, \ldots, S_{im}$ is input to a suspected pirate clone device that has been obtained by an authorized tracing agency. The initial partition is induced by the current set of revoked devices, or, if no devices have been revoked, the initial partition S is the set of all users. Moving to decision diamond 102, it is determined whether the clone has decrypted the content using the partition S in accordance with the above-disclosed principles of the Subset-Cover system, preferably in accordance with principles of the Subset Difference embodiment. A clone is considered to have decrypted content if it is able to decrypt messages with some predetermined probability, e.g., with p>0.5. In most practical clones, p=1. If the clone cannot decrypt, an encryption that defeats the clone has been found, and the process accordingly ends at state 104.

If, however, the clone has successfully decrypted the content, the process moves to block 124. At block 124, the Subset Tracing logic of FIG. 16, described further below, is executed on the partition S to produce a subset $S_{ij}$, and the logic proceeds to block 106 to receive the subset $S_{ij}$. Proceeding to decision diamond 108, it is determined whether the subset $S_{ij}$ has only a single traitor candidate, i.e., whether the subset $S_{ij}$ has only a single leaf. If so, the traitor has been found, and the process indicates the $j^{th}$ device as "traitor" and revokes the traitor by removing it from the set of non-revoked receivers and placing it in the set R of revoked receivers at block 110. A new cover set S is thereby defined at block 111, and the process moves to block 124, described more fully below.

When the subset $S_{ij}$ has more than a single traitor candidate, the logic flows from decision diamond 108 to block 112, wherein the set $S_{ij}$ is split into two child sets $S^1_{ij}$ and $S^2_{ij}$. This is possible, owing to the bifurcation property of the Subset-Cover systems, wherein subtrees can be split roughly (but not necessarily precisely) in two.

To realize an efficiency by reducing the length of the message required to trace t traitors, one preferred implementation can move from block 112 to the subroutine shown in blocks 114–122. This subroutine functions to merge subsets that have not yet been found to contain traitors into a single, efficiently processed group. If such reduction is not desired, $S_{1ij}$ and $S_{2ij}$ are added to the cover and blocks 114–122 are omitted.

At block 114, the child sets $S^1_{ij}$ and $S^2_{ij}$ are added to a frontier set F and are associated with each other as "buddy sets". Next, at decision diamond 116 it is determined whether the set $S_{ij}$ was in the previous frontier set F (i.e., the set F as it existed before the child sets $S^1_{ij}$ and $S^2_{ij}$ were added to it). If it was, this means that the set $S_{ij}$ had a complementary, so-called "buddy" set that was also in the frontier set F, and the "buddy" set (representing one or more receivers) is removed from the frontier set F at block 118. In this way, sets that have not yet been found to contain traitor candidates are grouped together apart from the frontier set F.

From block 118 or from decision diamond 116 if the test result there was negative, the logic flows to block 120, wherein a cover C is computed for all the receivers u that are not represented in sets in the frontier set F in accordance with Subset-Cover principles set forth above. Specifically, the receivers represented by sets in the frontier set F are temporarily classified in the revoked set R, and then a cover is determined in accordance with the above principles. At block 122, a new partition S is defined to be the union of the cover C with the subsets in the frontier set F. Then, the Subset Tracing logic of FIG. 16 is executed on the new S at block 124 to produce another $S_{ij}$, and the logic loops back to block 106.

Accordingly, now considering the Subset Tracing logic of FIG. 16, commencing at block 126 the partition S is received. The logic governs a sequence of steps; a typical step performs an encryption where the first j subsets are encoded with a false key $R_K$ having the same length as the session key K. That is, when p is the probability that the clone decrypts correctly with the partition S, a message is produced of the form $<E_{Li1}(R_K), E_{Li2}(R_K), \ldots, E_{Lij}(R_K), E_{Li(j+1)}(K), \ldots, E_{Lim}(K), F_K(M)>$ and $p_j$ is the probability of decrypting when the first j subsets contain the false key. If $|p_{j-1} - p_j| > p/m$ then according to the present invention $S_{ij}$ contains a leaf representing a traitor. To find a probability $p_j$, $m^2 \log(1/\epsilon)$ experiments are undertaken to determine how many times, out of the entire sequence of experiments, the clone outputs the real message M. In particular, if the clone does not have any keys from the last m-j subsets (that encrypt the actual session key K), it will never be able to determine M (other than by mere chance).

Accordingly, a binary search is executed to efficiently find an $S_{ij}$ containing a traitor, starting with the entire interval [0,m] and successively halving the interval using higher and lower bounds [a,b] (initialized at block 130 to [0,m]). Note that $p_0=p$ and $p_m=0$. Further, in most practical cases $p=1$, i.e., the clone always decrypts during normal operation.

The binary search starts at decision diamond 132, wherein it is determined whether the higher and lower bounds are one apart (indicating the end of the search). If so, the logic returns the index of the $j^{th}$ traitor as being the higher bound b at block 134. Otherwise, the logic flows to block 136 to find the probability of the midpoint c of the interval [a,b], i.e., the probability of decrypting when the first c subsets contain the false key and the others contain the true key.

In accordance with the present invention, the probability $p_j$ that a message is successfully decrypted when the first j subsets contain a false key is computed by repeatedly selecting a message M along with a key K, encrypting M as Fk(M), encoding the first j subsets with the false key and the last m-j subsets with the true key K, and observing whether the clone decrypts M successfully.

Then, at decision diamond 138 it is determined whether absolute value of the difference between the midpoint probability and the lower bound probability is at least equal to the absolute value of one-half of the difference between the lower and higher bound probabilities, i.e., to determine whether $|p_c-p_a|>|p_c-p_b|$. If it is, the interval is halved down at block 140 to [a,c] by making the higher bound b equal to the current midpoint c and by making the higher bound probability $p_b$ equal to the midpoint probability $p_c$. On the other hand, in the event of a negative test at decision diamond 138, the logic flows to block 142. At block 142, the interval is halved up to [c,b] by making the lower bound a equal to the current midpoint c and by making the lower bound probability $p_a$ equal to the midpoint probability $p_c$. The logic then loops back to decision diamond 132.

At block 136, the probability $p_c$ of the midpoint is preferably computed to an accuracy of $1/m$. To guarantee that $p_c$ is estimated accurately with a probability of $1-\epsilon$ it is required to observe $(m^2 \log(1/\epsilon))$ queries to the clone.

Accordingly, the logic of FIG. 16 preferably uses $m^2 \log(m) \log(1/\epsilon)$ queries to the clone. If desired, a noisy binary search can be undertaken that assumes, at each step, that the correct decision is obtained with a probability of $1-Q$, wherein Q is a value close to $1/2$, e.g., $Q=1/3$. In a model where each answer is correct with some fixed probability (e.g., greater than $2/3$) that is independent of history, it is possible to perform a binary search over m sets in $\log m + \log 1/Q$ queries. In the embodiment disclosed above, it can be assumed that the midpoint probability may yield a faulty value with probability Q. This implies that the number of queries over the entire procedure can be reduced to $m^2(\log m + \log 1/Q)$ since $m^2$ queries are required at each step to accurately compute $p_c$ with probability $1-Q$.

Traitors can be traced from more than one clone by running the tracing algorithm in parallel on the clones with the same input. The initial input is a partition $S_0$ that results from the set of all users, with none having been placed in the revoked set R. As the process moves forward, when the first clone "detects" a traitor in one of its sets it re-partitions accordingly (by moving the traitor to the revoked set R). The new partition is then input to all clones simultaneously. The output of the simultaneous method is a partition (or "revocation strategy") that renders all revoked receivers and clones invalid.

The present invention affords the ability to trace a comparatively large number of traitors using a relatively small message. It can be integrated seamlessly with the above-referenced Subset-Cover system. Also, no a priori bound on the number of traitors that can be traced is required. Still further, the present invention functions by either tracing the traitors or rendering the pirate clones useless regardless of what the clone does to counter the tracing.

While the particular METHOD FOR TRACING TRAITOR RECEIVERS IN A BROADCAST ENCRYPTION SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A method for identifying disabling at least one traitor receiver with at least one associated unique, compromised decryption key in a broadcast encryption system, comprising:
   receiving a set of subsets derived from a tree defining leaves, each leaf representing a respective receiver;
   identifying at least one traitor subset from the set of subsets as containing at least one leaf representing a candidate traitor receiver;
   using the traitor subset, undertaking at least one of identifying disabling the traitor receiver; and
   determining whether the traitor subset represents at least two traitor receiver candidates, and if so, dividing the traitor subset into two child sets, wherein the act of identifying or disabling includes encoding plural subsets of the set of subsets with a false key.

2. The method of claim 1, further comprising determining whether the traitor subset is a member of a frontier set, and if so, removing a complementary subset from the frontier set.

3. The method of claim 1, further comprising executing a binary search on the set of subsets using probabilities.

4. The method of claim 3, wherein the binary search ends by determining that the difference between a probability $p_j$ of decrypting a message when the first j subsets contain the false key and a probability $p_{j-1}$ of decrypting a message when the first j-1 subsets contain the false key is at least equal to a predetermined probability.

5. The method of claim 4, wherein the traitor subset is identified when $|p_{j-1}-p_j|>p/m$, wherein m is the number of subsets in the set of subsets.

6. The method of claim 1, further comprising identifying or disabling plural traitor receivers embodied in a clone.

7. The method of claim 1, wherein the act of identifying or disabling includes encoding the first j subsets of the set of subsets with a false key.

8. A device, comprising:
a computer readable medium, comprising:
logic means for accessing a tree to generate a set of subsets of the tree, the tree including leaves representing at least one traitor device characterized by a compromised key;
logic means for encrypting a false key j times and for encrypting a session key m-j times, wherein m is a number of subsets in the set of subsets;
logic means responsive to the means for encrypting for identifying a traitor subset; and logic means for using the traitor subset to identify or disable the traitor device.

9. The computer program device of claim 8, further comprising:
logic means for determining whether the traitor subset represents a least two candidate traitor devices, and if so, dividing the traitor subset into two child sets.

10. The computer program device of claim 9, further comprising logic means for determining whether the traitor subset is a member of a frontier set, and if so, removing a complementary subset from the frontier set.

11. The computer program device of claim 8, further comprising logic means for executing a binary search an the set of subsets using probabilities.

12. The computer program device of claim 11, wherein the binary search ends by determining that the difference between a probability $p_j$ of decrypting a message when the first j subsets contain the false key and a probability $p_{j-}$ of decrypting a message when the first j-1 subsets contain the false key is at least equal to a predetermined probability.

13. The computer program device of claim 12, wherein the traitor subset is identified when $|p_{j-1}-p_j|>p/m$, wherein m is the number of subsets in the set of subsets.

14. A computer programmed with instructions to cause the computer to execute method acts including:
using a false key to encode plural subsets representing stateless receivers, at least one traitor receiver of which is associated with at least one compromised key that has been obtained by at least one pirate receiver; and
using the pirate receiver or a clone thereof, determining the identity of the traitor receiver, or rendering the pirate receiver or clone thereof useless for decrypting data using the compromised key.

15. The computer of claim 14, wherein the subsets define a set of subsets, and the method acts undertaken by the computer further include:
receiving the set of subsets derived from a tree defining leaves, each leaf representing a respective receiver;
identifying at least one traitor subset from the set of subsets as containing at least one leaf representing the traitor receiver; and
using the traitor subset, identifying the traitor receiver.

16. The computer of claim 15, wherein the method acts undertaken by the computer further comprise:
determining whether the traitor subset represents at least two candidate traitor receivers, and if so, dividing the traitor subset into two child sets.

17. The computer of claim 16, wherein the method acts undertaken by the computer further comprise determining whether the traitor subset is a member of a frontier set, and if so, removing a complementary subset from the frontier set.

18. The computer of claim 15, wherein the act of identifying includes:
encoding plural subsets of the set of subsets with the false key.

19. The computer of claim 18, wherein the method acts undertaken by the computer further Comprise executing a binary search on the set of subsets using probabilities.

20. The computer of claim 19, wherein the binary search ends by determining that a probability $p_j$ of decrypting a message when the first j subsets contain the false key is at least equal to a predetermined probability.

21. The computer of claim 20, wherein the traitor subset is identified when $|P_{j-1}-p_j|>p/m$, wherein m is the number of subsets in the set of subsets.

* * * * *